United States Patent [19]

Duncan

[11] Patent Number: 4,480,806
[45] Date of Patent: Nov. 6, 1984

[54] EJECTION SEAT STABILIZATION APPARATUS

[75] Inventor: James W. Duncan, Arden, N.C.

[73] Assignee: Stencel Aero Engineering Corporation, Arden, N.C.

[21] Appl. No.: 439,933

[22] Filed: Nov. 8, 1982

[51] Int. Cl.³ .............................................. B64D 25/10
[52] U.S. Cl. ................................. 244/122 A; 244/87; 244/91
[58] Field of Search .............. 244/122, 138 R, 138 A, 244/91, 90 R, 213, 113, 3.27–3.29, 3.23, 3.1, 141, 140, 87, 49; 102/384–388

[56] References Cited

U.S. PATENT DOCUMENTS

| 2,527,020 | 10/1950 | Martin | 244/122 |
|---|---|---|---|
| 2,541,087 | 2/1951 | Musser | 244/122 |
| 2,552,181 | 5/1951 | Kleinhans | 244/122 |
| 2,702,680 | 2/1955 | Heinemann et al. | 244/140 |
| 2,755,042 | 7/1956 | Paddon | 244/122 |
| 2,806,666 | 9/1957 | Brown et al. | 244/140 |
| 2,829,850 | 4/1958 | Culver | 244/141 |
| 2,941,764 | 6/1960 | Lee, Jr. et al. | 244/140 |
| 2,947,503 | 8/1960 | Holcomb | 244/122 |
| 2,977,080 | 3/1961 | von Zborowski | 244/140 |
| 3,015,462 | 1/1962 | Simmons et al. | 244/122 |
| 3,027,126 | 3/1962 | Wallace | 244/141 |
| 3,063,375 | 11/1962 | Hawley et al. | 244/3.27 |
| 3,067,973 | 12/1962 | Halsey et al. | 244/140 |
| 3,127,838 | 4/1964 | Moratti et al. | 244/3.29 |
| 3,374,965 | 3/1968 | Deutsch | 244/1 |
| 3,881,671 | 5/1975 | Bouchnik | 244/140 |
| 4,057,206 | 11/1977 | Duncan et al. | 244/147 |
| 4,135,687 | 1/1979 | Jones, Jr. | 244/91 |

FOREIGN PATENT DOCUMENTS 1046093 12/1953 France .............. 244/122 A

Primary Examiner—Galen L. Barefoot
Attorney, Agent, or Firm—Roylance, Abrams, Berdo & Goodman

[57] ABSTRACT

An ejection seat is provided with fins on opposite sides which are normally stored along the seat side rails and are deployed immediately after ejection to yaw-stabilize the seat as it is slowed by a drogue. The fins are mounted for rotation and are deployed such that they extend rearwardly and out to the sides.

7 Claims, 8 Drawing Figures

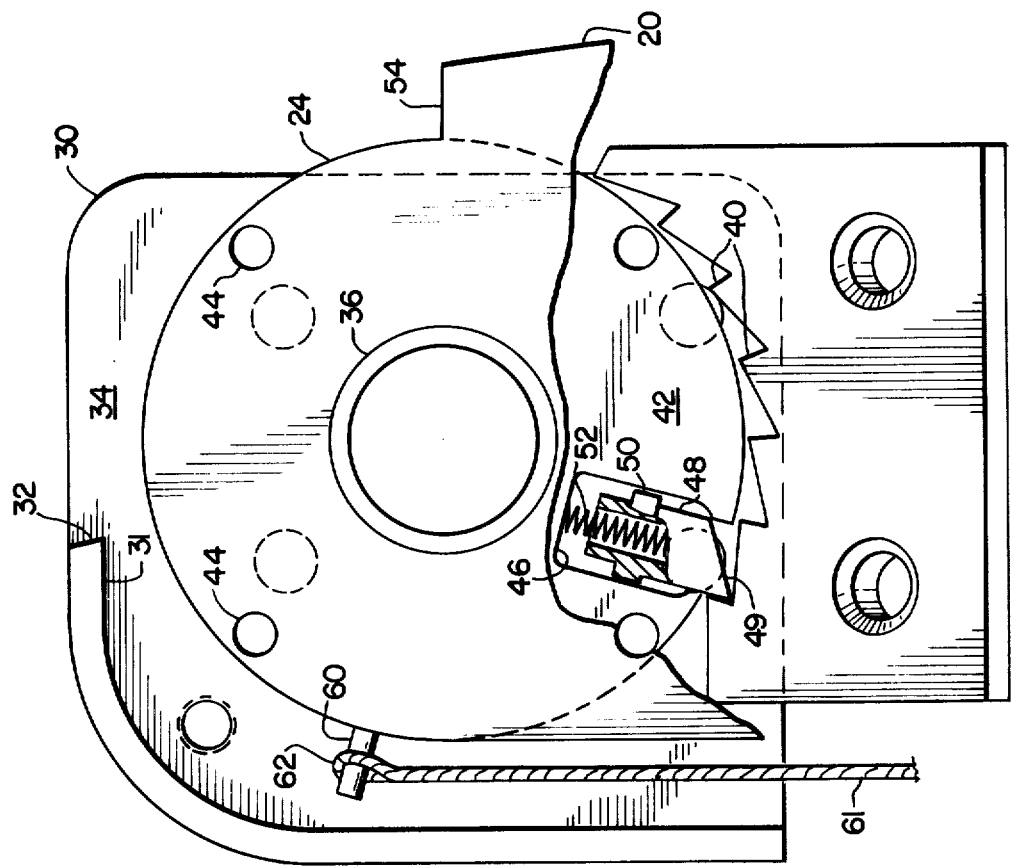
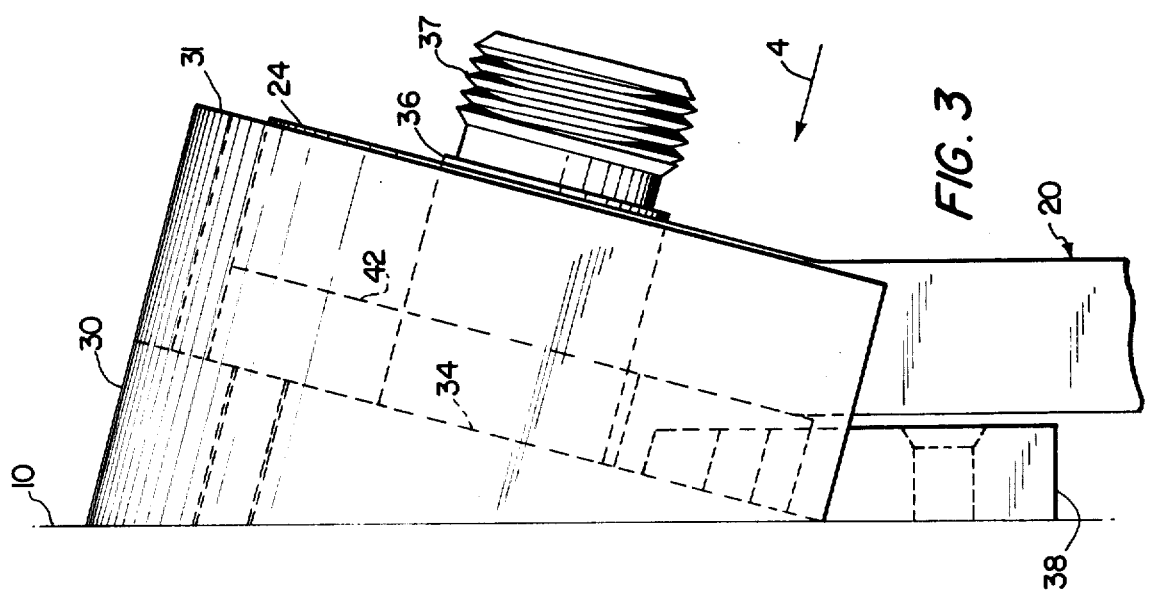

EJECTION SEAT STABILIZATION APPARATUS

This invention relates to stabilizing apparatus for a seat of the type which can be ejected from an aircraft and which is designed to be lowered to the earth by a parachute, and particularly to stabilizing means operative during the interval between ejection and full parachute deployment.

BACKGROUND OF THE INVENTION

Although ejection of a seat and its occupant from an aircraft is a life-preserving technique which has been known and used for many years, it is still and will remain a somewhat hazardous event because of the inescapable facts that the aircraft from which the occupant is being ejected is usually traveling at a rather high speed and the seat is not designed to be an efficient "flying machine". Although structures have been proposed to enclose the pilot in a capsule of some sort as he is separated from the aircraft, most such proposals are not feasible for most aircraft because they add greatly to the aircraft weight, require substantial modifications to aircraft design and excessively complicate arranging the controls used by the pilot during normal flight.

The most effective and acceptable system thus uses the seat itself to carry the pilot (or other occupant) out of the aircraft after which the pilot or, in some systems the seat and pilot, are lowered by parachute to safety. Such systems have become quite reliable and greatly enhance the safe survival chances of an occupant who finds himself in an aircraft no longer able to fly, but they still subject the occupant to physiological stresses and, because of the erratic movement of the seat after it has been suddenly introduced into the airstream outside of the aircraft, can also put undesirable strains on the equipment.

BRIEF DESCRIPTION OF THE INVENTION

Accordingly, an object of the present invention is to provide an improved stabilization apparatus for an ejection seat including fins which can be deployed to yaw-stabilize the seat following ejection.

A further object is to provide a stabilizing fin structure which can be deployed aerodynamically and locked in the deployed position.

Yet another object is to arrange the fins and drogue such that the attitude of the ejection seat allows the size of the fins to be minimized.

Briefly described, the invention includes an apparatus for aerodynamically yaw-stabilizing an aircraft seat after ejection of the seat and its occupant from the aircraft and deployment of a drogue parachute but before deployment of a supporting parachute, the seat being of the type having side structural members lying in generally vertical, parallel planes generally defining the lateral limits of the seat back, the apparatus comprising the combination of first and second stabilizing fins, each of said fins having an elongated shape, one of said fins being designated for use on the left side of the seat and the other for use on the right side, an end portion of each of said fins being bent to lie at an obtuse angle A relative to the remaining major portion thereof; and first and second means attached to the side members of said seat and to said end portions of said fins for rotatably supporting said fins for movement between a stowed position in which said end portions of said fins lie in planes generally parallel with said side members and a deployed position in which said fins are rotated to the rear of said seat through an angle of between about 80° and about 120° from said stowed position and in which said major portions lie in planes forming an acute angle C with the planes containing said side members and forming an acute angle 2 C with each other.

DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is an enlarged partial front elevation of the fins supporting portion of the apparatus of FIGS. 1 and 2;

FIG. 4 is a side elevation of the structure of FIG. 3;

DETAILED DESCRIPTION OF A PREFERRED EMBODIMENT

Figure 1:
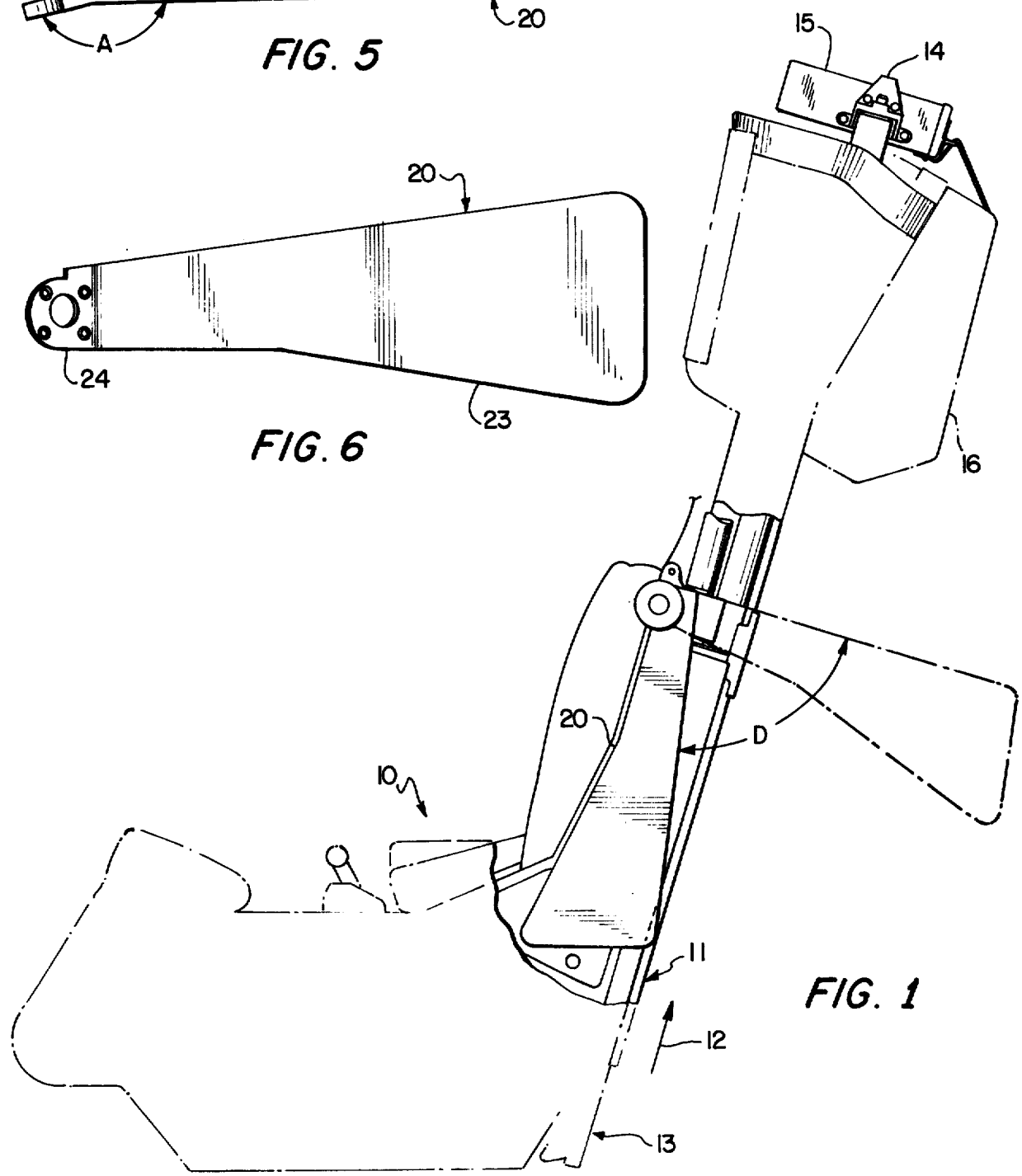
FIG. 1 is a simplified side elevation of an ejection seat including an apparatus in accordance with the invention.

FIG. 1 shows, in outline, an aircraft seat indicated generally at 10 which is of a type designed to be ejected from the aircraft with the occupant seated therein. The specific type of seat can vary, and the seat and ejection mechanism itself therefore will not be discussed in detail. It will be sufficient to note that the seat includes means indicated generally at 11 forming side members which slidably mate with rails attached to the aircraft so that the seat is moveable in the direction of arrow 12. Also, the seat normally has means indicated generally at 13 including a rocket propulsion device or the like for propelling the seat along the rails and out of the aircraft. At the upper end of the seat structure is a canopy penetrating device 14, a drogue parachute container 15 and a main parachute container 16. Following ejection of the seat from the aircraft, a control device known as a sequencer controls deployment of the drogue chute and of the main chute at appropriate times, depending upon the speed and altitude of the seat after separation from the aircraft. Again, the sequencing is not particularly relevant to the present invention except to note that there is an interval of time between ejection and deployment of the main parachute during which the seat is "flying" and needs to be stabilized. The drogue parachute accomplishes some of this stabilizing function, but the seat is still free to rotate about an axis roughly defined by the lines interconnecting the drogue parachute with the seat, and this movement, referred to as yaw, must be controlled. For this purpose, the seat is provided with stabilizing fins 20 and 21, the left fin 20 being visible in FIG. 1. As shown in broken outline, fins 20 and 21 are rotatably mounted so as to be movable through an angle D from their stowed position shown in solid lines to the broken-line deployed position.

Figure 5:
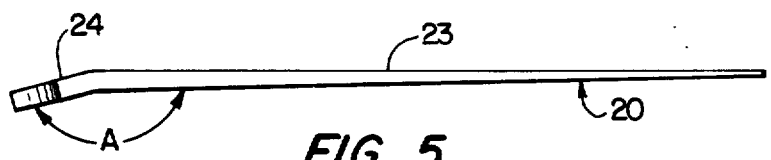
FIGS. 5 and 6 are side elevation and top plan views, respectively, of the fin alone.
Figure 6:
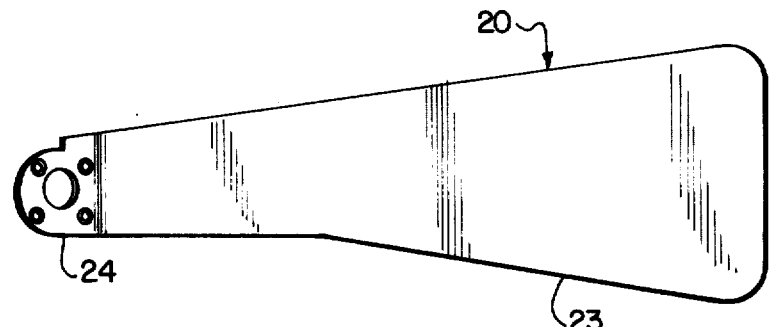

The fins are shaped substantially identically to each other except that a bend is in the opposite direction in the left fin from the right. Left fin 20 is shown separately in FIGS. 5 and 6 wherein it will be seen that it has a major portion 23 which is generally trapezoidal in shape with the thickness tapering to a thin edge at the larger end. A somewhat smaller end portion 24 is bent to form an obtuse angle A with the major portion, this angle preferably being about 165°. FIG. 6 also shows mounting holes and a stop shoulder which will be discussed in connection with FIGS. 3 and 4.

The specific mounting arrangement is shown in greater detail in FIGS. 3 and 4. It will be observed that FIG. 3 is an enlargement of the upper portion of fin 20 at the rotary connection thereof with the side of seat 10, and FIG. 4 is a side elevation at an angle indicated by arrow 4 in FIG. 3.

Figure 2:
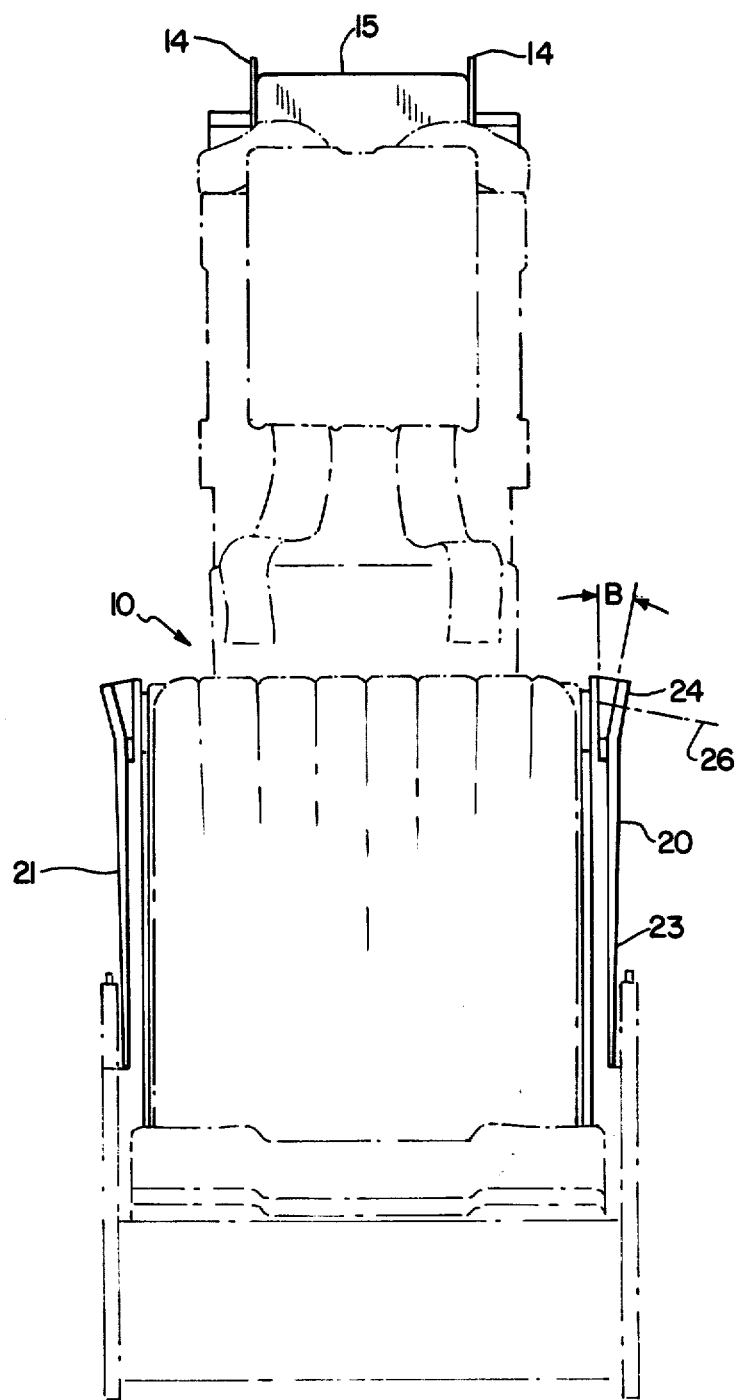
FIG. 2 is a front elevation of the apparatus of FIG. 1.
Figure 7:
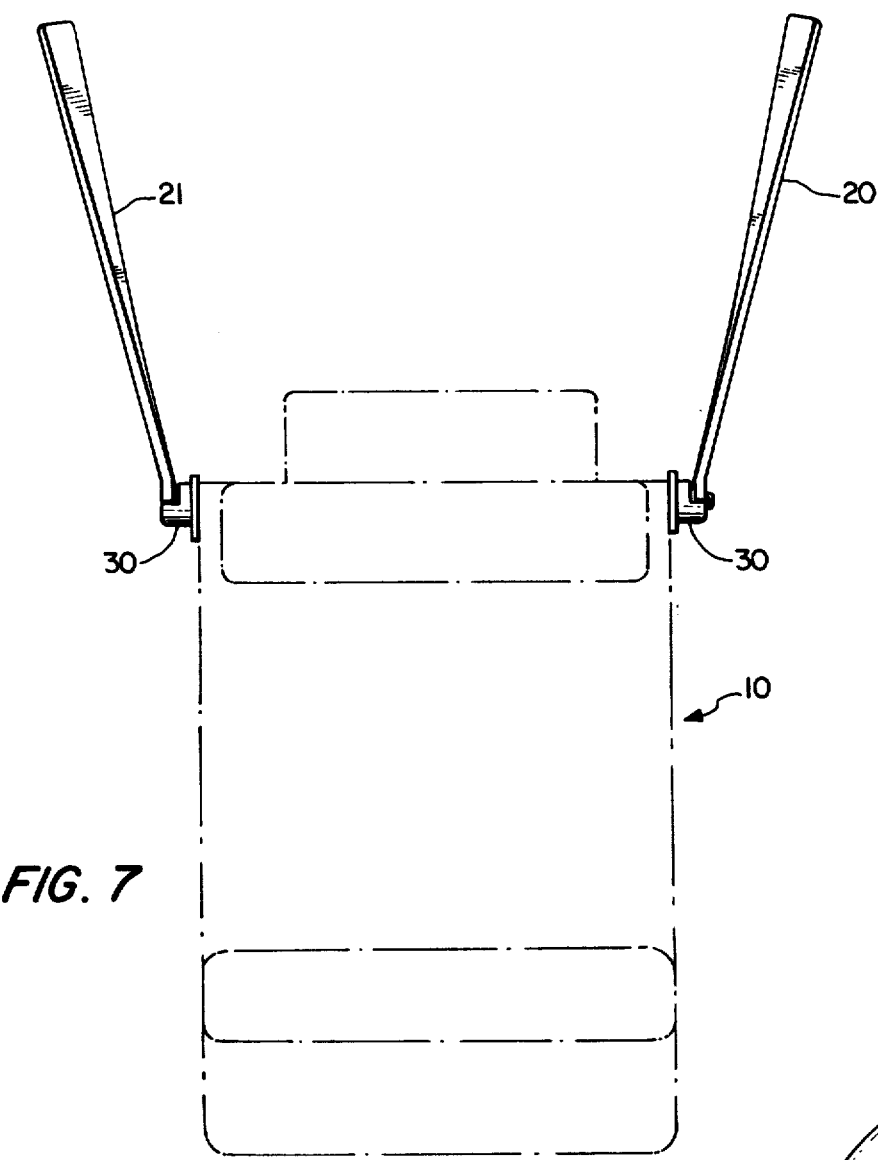
FIG. 7 is a partial top plan view of the seat and fin structure with the fins deployed.

As seen in these figures, the mounting structure for the left fin includes a base plate 30 one surface of which lies against the substantially vertical side surface of its associated side member of seat 10, and the other surface 34 of which forms an acute angle therewith. The angle, illustrated in FIG. 2 as angle B, is preferably 15°. As seen in FIG. 4, a wall 31 is fixedly attached to the outer surface 34 of plate 30 and extend along the front edge thereof and around an upper corner, terminating at a stop surface 32.

A cylindrical shaft 36 protrudes perpendicularly from surface 34, the shaft having an externally threaded end portion 37 separated from the smooth remaining portion of the shaft by a short portion of reduced diameter.

Adjacent base plate 30 is a ratchet plate 38 which has a rectangular lower portion including openings to receive screws for attaching the ratchet plate to the side of the seat. The upper portion of plate 38 is formed with a series of ratchet teeth 40, each tooth having a face (facing to the right in FIG. 4) which lies along a radius of a circle centered on the central axis of shaft 36. The other face of each tooth lies approximately along the tangent to the tooth peak circle at the peak of the next adjacent tooth. A rotatable pawl plate 42 has a central opening which surrounds shaft 36 so that plate 42 is freely rotatable with respect to the shaft. The periphery of plate 42 is selected to have a radius slightly smaller than the radius of the peaks of ratchet teeth 40 with respect to the center of shaft 36. The end portion of fin 20 is provided with a plurality of openings 44 which are aligned with similar openings in plate 42 to receive screws, the openings in plate 42 being internally threaded so that the fin can be fixedly attached to, and rotatable with, plate 42. Plate 42 is provided with an inwardly extending recess 46 which is generally rectangular in shape and which receives a pawl 48. Pawl 48 has a generally rectangular cross-sectional shape and an end surface 49 which is inclined, forming a tip having an acute angle. Pawl 48 also has an enlarged portion 50 which fits within recess 46 in relatively close sliding relationship so that the pawl can move in a generally radial direction with respect to pawl plate 42. Pawl 48 is urged radially outwardly by a compression coil spring 52 which is received in a blind bore in pawl 48.

As will be seen in FIG. 4, the radial surface of the pawl tip engages the radial surfaces of each of teeth 40 as the fin moves from its stored toward its deployed position and thereby prevents reverse movement thereof. Ultimately, when the fin has swung through the maximum available angle, a shoulder 54 formed as a part of end portion 24 of the fin comes in contact with stop surface 32 on wall 31, limiting the movement of the fin to a position such as that shown in FIG. 1.

The fins are designed and positioned so that they will be contacted and deployed by the airstream passing the seat as it moves in the forward direction (to the left in FIG. 1) as soon as the fins are clear of the cockpit area. However, as a safety measure to be sure that the fins are deployed promptly, a positive mechanical deployment apparatus is provided. A radially extending pin 60 is mounted in the side of pawl plate 42. One end of a lanyard 61 is provided with a loop 62 which surrounds pin 60, the other end of the lanyard being attached firmly to a fixed point within the cockpit (i.e., a point which is not to be ejected.) The radius on which pin 60 is mounted is about 15° above horizontal. The length of lanyard 61 is chosen such that, as soon as the larger ends of fins 20, 21 have cleared the aircraft, the lanyard is straightened to its full length whereupon loop 62 pulls pin 60 downwardly, exerting torgue on plate 42 and the fin and at least initiating its movement toward the deployed position. As will be recognized, as soon as fin 60 has rotated to a position somewhat below the horizontal, the eye 62 will slip off of the end of the pin so that the lanyard does not exert any impeding force on further movement of the ejected seat. The mounting structure for the right-hand fin is, of course, the same but in mirror image.

Figure 8:
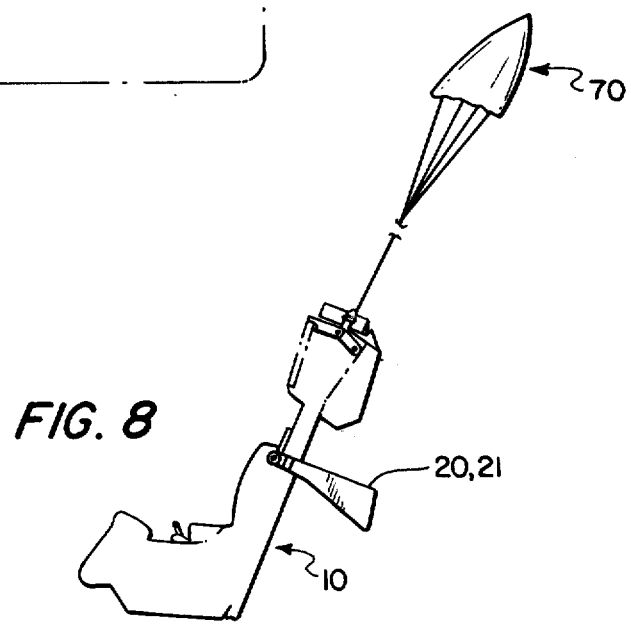
FIG. 8 is a diagrammatic view of the seat, drogue and fin relationship after ejection.

As viewed from above, the seat with the fins deployed shows that the fins make an angle of about 15° with a fore-and-aft center line of the seat and about 30° with each other. With the drogue chute 70 at least partially deployed, as seen in FIG. 8, the seat tends to tilt back slightly and is held generally upright, the fins serving to provide the needed yaw stabilization, preventing rotation about the chute lines.

While one advantageous embodiment has been chosen to illustrate the invention, it will be understood by those skilled in the art that various changes and modifications can be made therein without departing from the scope of the invention as defined in the appended claims.

What is claimed is:

1. An apparatus for aerodynamically yaw-stabilizing an aircraft seat after ejection of the seat and its occupant from the aircraft and deployment of a drogue parachute but before deployment of a supporting parachute, the seat being of the type having side structural members lying in generally vertical, parallel planes generally defining the lateral limits of the seat back, the apparatus comprising the combination of:

first and second yaw stabilizing fins, each of said fins having an elongated shape, one of said fins being designated for use on the left side of the seat and the other for use on the right side, one end portion of said fins being bent to lie at an obtuse angle A relative to the remaining major portion thereof; and first and second means, attached respectively to the side members of said seat and to said end portions of said fins, for rotatably supporting said fins for movement between a stowed position in which said end portions of said fins lie in planes forming an acute angle B with the planes containing said side members and said remaining major portions of said fins lie in planes generally parallel with said side members and a deployed position in which said fins are rotated to the rear of said seat through an angle of between about 80° and about 120° from said stowed position to rearwardly extending positions and in which said major portions lie in outwardly extending planes forming an acute angle C with the planes containing said side members and forming an acute angle 2 C with each other.

2. An apparatus according to claim 1 wherein each of said angles B and C equals about 15° and angle A is about 165°.

3. An apparatus according to claim 1 wherein each of said means for rotatably supporting said fins includes
means for preventing significant rotational movement of said fin in the direction from said deployed position toward said stowed position.

4. An apparatus according to claim 3 and further comprising means for coupling the drogue to the top portion of said seat to maintain said seat in a generally upright position.

5. An apparatus according to claim 1 wherein each of said first and second means attached to said side members includes
a base member fixedly attached to a side member;
a generally cylindrical axle member extending outwardly from said base member;
means defining a plurality of ratchet teeth extending generally radially toward said axle member; and
means including a pawl member attached to said one end portion of said fin and rotatably supported on said axle member with said pawl engaging said teeth,
the inclined surfaces of said pawl member and said teeth being oriented to permit continued motion only in the direction from said stowed position toward said deployed position.

6. An apparatus according to claim 5 and further comprising
a stop member on said base member; and
means defining a stop shoulder on said one end portion of said fin for limiting the motion of said fin at said deployed position.

7. An apparatus according to claim 1 and further comprising
means for assisting deployment of each said fin comprising a radially extending pin attached to a rotatable portion of said means for rotatably supporting said fins; and
a flexible lanyard extending between said pin and a non-ejected portion of said aircraft, the length of said lanyard and the position of said pin being chosen such that said lanyard pulls on said pin and rotates said fin from the stowed position toward the deployed position after said seat has substantially left the aircraft.

* * * * *